United States Patent
De La Cruz

(10) Patent No.: US 11,479,172 B2
(45) Date of Patent: Oct. 25, 2022

(54) UNATTENDED OCCUPANT ALARM ASSEMBLY

(71) Applicant: Adriano De La Cruz, Brooklyn, NY (US)

(72) Inventor: Adriano De La Cruz, Brooklyn, NY (US)

( * ) Notice: Subject to any disclaimer, the term of this patent is extended or adjusted under 35 U.S.C. 154(b) by 314 days.

(21) Appl. No.: 16/822,794

(22) Filed: Mar. 18, 2020

(65) Prior Publication Data

US 2021/0291730 A1    Sep. 23, 2021

(51) Int. Cl.
| | |
|---|---|
| B60Q 9/00 | (2006.01) |
| B60N 2/00 | (2006.01) |
| E05F 15/75 | (2015.01) |
| E05F 15/79 | (2015.01) |
| B60R 16/033 | (2006.01) |
| H02J 7/35 | (2006.01) |

(52) U.S. Cl.
CPC .............. *B60Q 9/00* (2013.01); *B60N 2/002* (2013.01); *B60R 16/033* (2013.01); *E05F 15/75* (2015.01); *E05F 15/79* (2015.01); *H02J 7/35* (2013.01); *E05Y 2400/44* (2013.01); *E05Y 2400/45* (2013.01); *E05Y 2400/52* (2013.01); *E05Y 2400/858* (2013.01); *E05Y 2900/55* (2013.01)

(58) Field of Classification Search
CPC combination set(s) only.
See application file for complete search history.

(56) References Cited

U.S. PATENT DOCUMENTS

| | | | |
|---|---|---|---|
| 6,922,147 B1 | 7/2005 | Viksnius | |
| 7,123,157 B2 | 10/2006 | Best | |
| 8,063,788 B1 | 11/2011 | Morningstar | |
| 9,403,437 B1 * | 8/2016 | McDonald | B60K 35/00 |
| 10,297,130 B2 | 5/2019 | Friedman | |
| 2002/0161501 A1 * | 10/2002 | Dulin | B60H 1/00742 701/45 |
| 2003/0102688 A1 * | 6/2003 | Bingle | G08B 21/22 296/76 |
| 2007/0052529 A1 | 3/2007 | Perez | |
| 2007/0075575 A1 | 4/2007 | Gregory | |
| 2017/0282822 A1 | 10/2017 | Hunter, Jr. | |

FOREIGN PATENT DOCUMENTS

| | | |
|---|---|---|
| CA | 2960849 | 9/2017 |
| EP | 3862220 A1 * | 8/2021 |

* cited by examiner

*Primary Examiner* — Anne Marie Antonucci
*Assistant Examiner* — Jingli Wang

(57) ABSTRACT

An unattended occupant alarm assembly includes a plurality of passenger pressure pads that is each integrated into a respective passenger seat in a vehicle to detect the weight of a passenger sitting in any other the passenger seats. A driver pressure pad is integrated into a driver's seat of the vehicle to detect the weight of a driver sitting in the driver's seat. A control unit is coupled to the vehicle. The control unit is actuated into an alert condition when the driver pressure pad does not detect the weight of the driver and any of the passenger pressure pads detects the weight of the passenger after a pre-determined duration of time. Additionally, the vehicle horn is actuated to emit an audible alarm and the electric window system is actuated to roll down windows of the vehicle when the control unit is actuated into the alert condition.

5 Claims, 5 Drawing Sheets

UNATTENDED OCCUPANT ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to occupant alarm devices and more particularly pertains to a new occupant alarm device for inhibiting an occupant from being left unattended in a vehicle.

(2) Description of Related Art Including Information Disclosed Under 37 CFR 1.97 and 1.98

The prior art relates to occupant alarm devices. The prior art discloses an occupant alarm that includes pressure sensors and a temperature sensor for determining if an occupant has been left unattended in a vehicle with dangerously high temperatures. The prior art also discloses an occupant alarm with a driver weight sensor and a passenger sensor which is triggered any time the driver gets up from the driver's seat while the passenger is seated in a passenger seat. The prior art also discloses an occupant alarm that includes a pressure pad in child seat that detects when a child is seated in the child seat and emits an audible alarm whenever the driver's seat belt is unbuckled and the child is in the child seat. In each case of the prior art that includes an electronic timer, only one duration of time is involved in producing an audible alarm, rather than two separate durations of time as is disclosed in the following application.

BRIEF SUMMARY OF THE INVENTION

An embodiment of the disclosure meets the needs presented above by generally comprising a plurality of passenger pressure pads that is each integrated into a respective passenger seat in a vehicle to detect the weight of a passenger sitting in any other the passenger seats. A driver pressure pad is integrated into a driver's seat of the vehicle to detect the weight of a driver sitting in the driver's seat. A control unit is coupled to the vehicle. The control unit is actuated into an alert condition when the driver pressure pad does not detect the weight of the driver and any of the passenger pressure pads detects the weight of the passenger after a pre-determined duration of time. Additionally, the vehicle horn is actuated to emit an audible alarm and the electric window system is actuated to roll down windows of the vehicle when the control unit is actuated into the alert condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
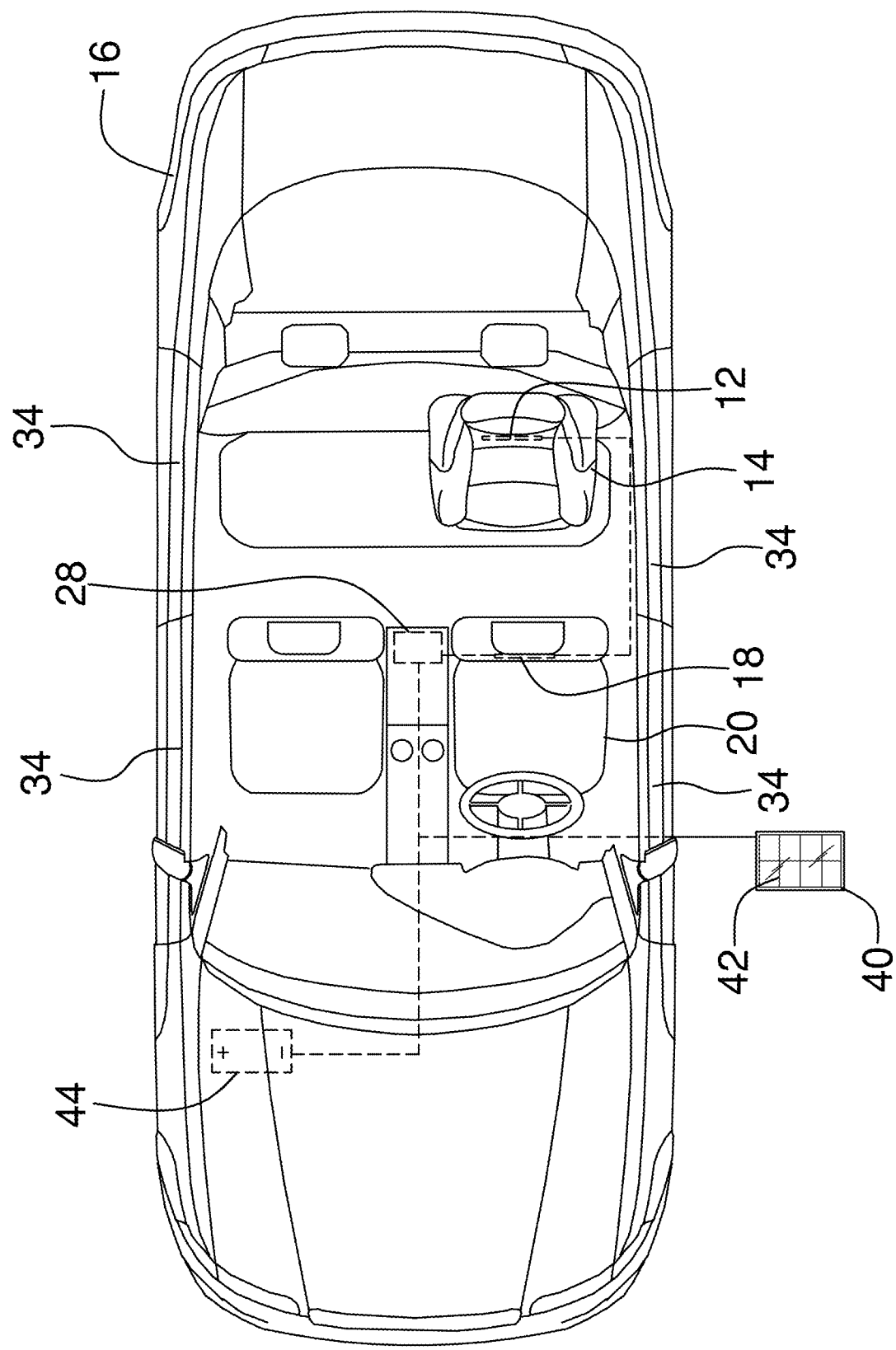
FIG. 1 is a top phantom view of an unattended occupant alarm assembly according to an embodiment of the disclosure.
Figure 2:
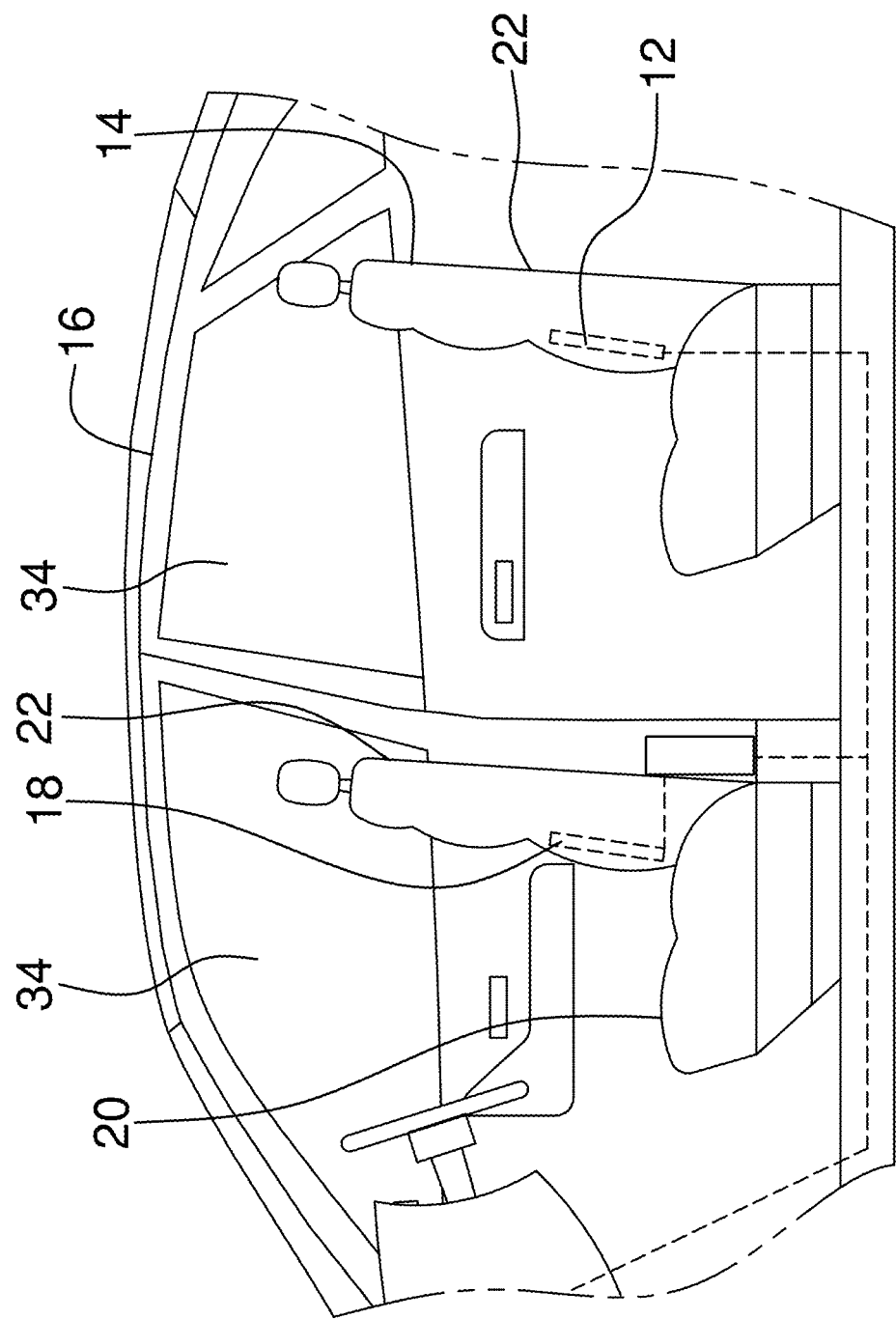
FIG. 2 is a phantom left side view of an embodiment of the disclosure.
Figure 3:
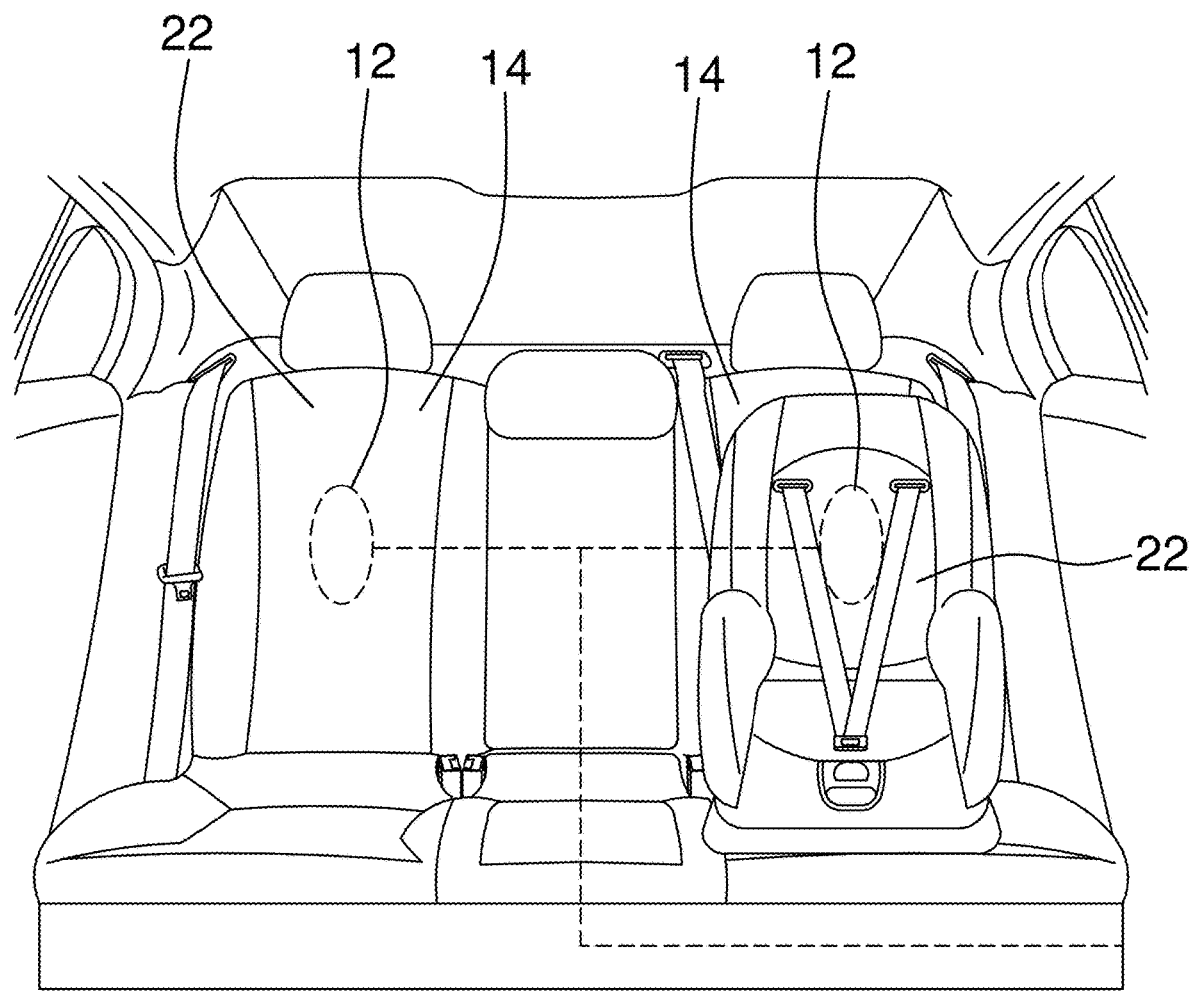
FIG. 3 is a phantom interior view of an embodiment of the disclosure.
Figure 4:
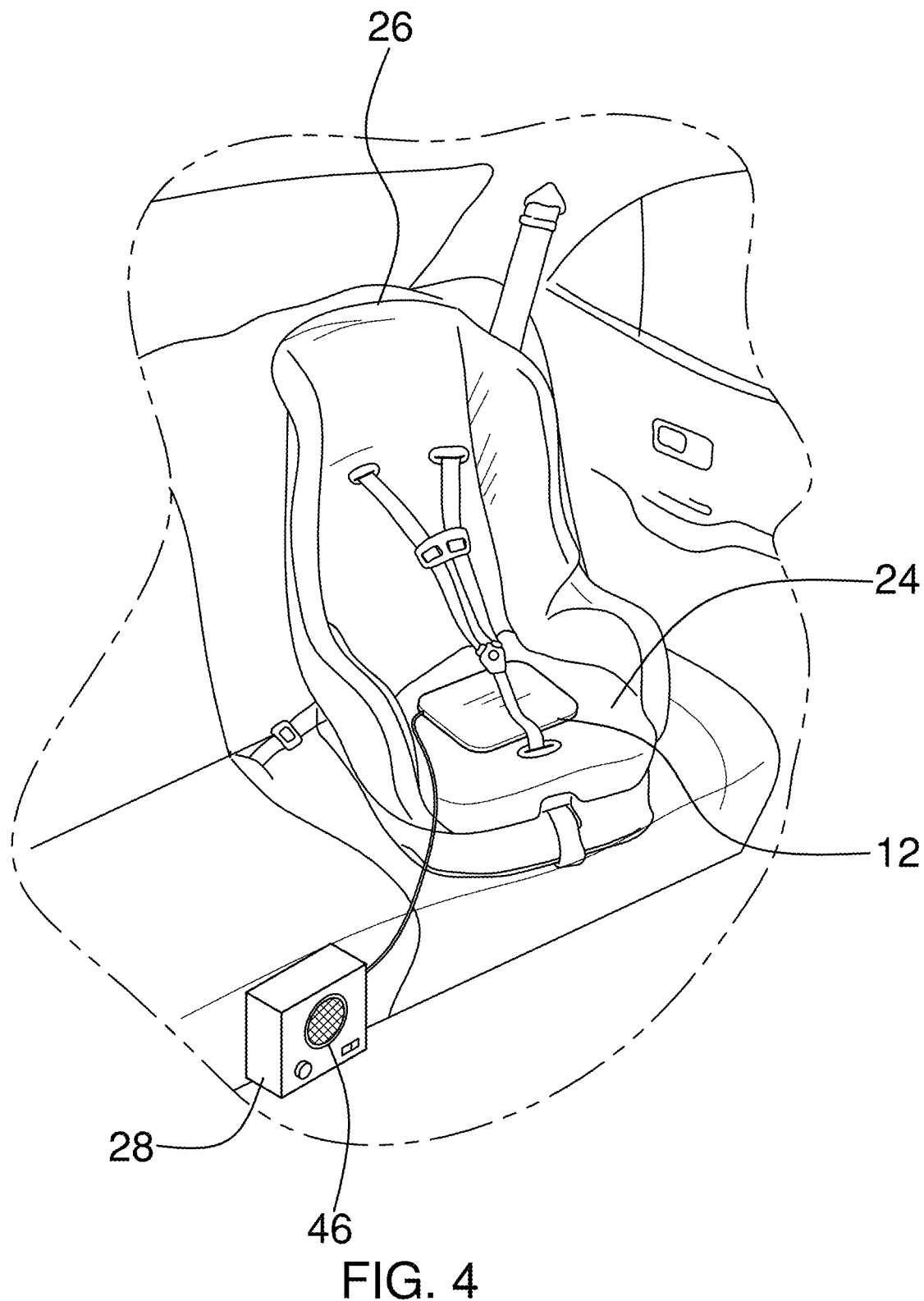
FIG. 4 is a perspective interior view of an embodiment of the disclosure.
Figure 5:
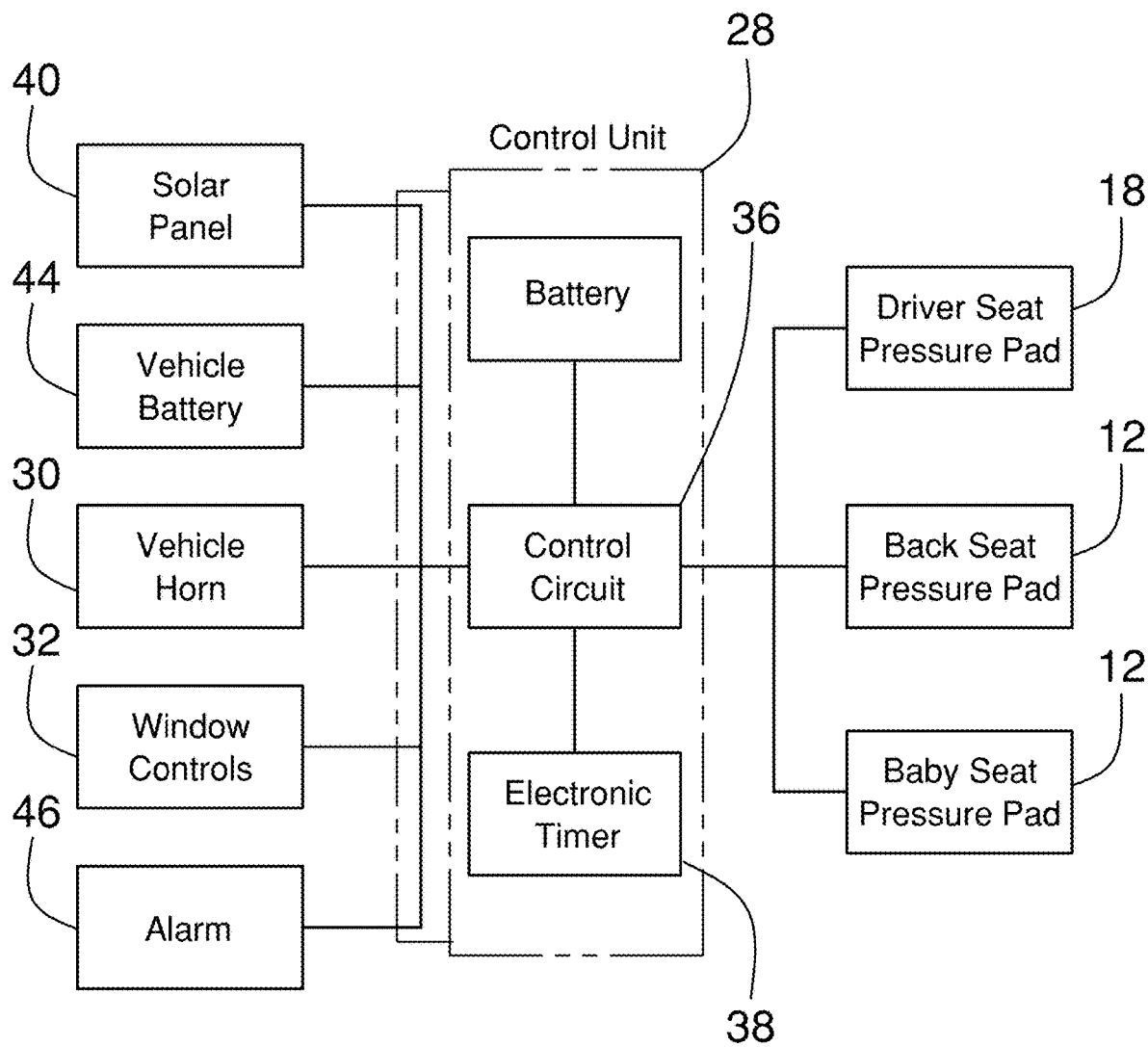
FIG. 5 is a schematic view of an embodiment of the disclosure.

With reference now to the drawings, and in particular to FIGS. 1 through 5 thereof, a new occupant alarm device embodying the principles and concepts of an embodiment of the disclosure and generally designated by the reference numeral 10 will be described.

As best illustrated in FIGS. 1 through 5, the unattended occupant alarm assembly 10 generally comprises a plurality of passenger pressure pads 12 that is each integrated into a respective passenger seat 14 in a vehicle 16. In this way each of the passenger pressure pads 12 can detect the weight of a passenger sitting in any other the passenger seats 14. Each of the passenger pressure pads 12 may comprise an electronic weight sensor with a trigger weight of approximately 10.0 pounds. A driver pressure pad 18 is integrated into a driver's seat 20 of the vehicle 16 to detect the weight of a driver sitting in the driver's seat 20. The driver pressure pad 18 may comprise an electronic weight sensor with a trigger weight of approximately 50.0 pounds. Moreover, the vehicle 16 may be a sedan, a coupe, a pickup or any other motorized passenger vehicle. As is most clearly shown in FIG. 2, each of the driver pressure pad 18 and the passenger pressure pads 12 may be integrated into a backrest 22 of the respective driver's seat 20 and passenger seat 14. As is most clearly shown in FIG. 4, a respective one of the passenger pressure pads 12 may be positioned on a seat portion 24 of a child car seat 26.

A control unit 28 is provided and the control unit 28 is coupled to the vehicle 16. The control unit 28 is in electrical communication with each of the passenger pressure pads 12 and the driver pressure pad 18. The control unit 28 is actuated into a monitoring condition when the driver pressure pad 18 and any of the passenger pressure pads 12 respectively detects weight of the driver and weight of the passenger. The control unit 28 is actuated into a standby condition when the driver pressure pad 18 does not detect the weight of the driver and any of the passenger pressure pads 12 detects the weight of the passenger. Moreover, the control unit 28 is actuated into an alert condition when the driver pressure pad 18 does not detect the weight of the driver and any of the passenger pressure pads 12 detects the weight of the passenger after the control unit 28 has been actuated into the standby condition for a pre-determined duration of time. As is most clearly shown in FIG. 4, the control unit 28 may be mountable in an interior of the vehicle 16 and the control unit 28 may have a wiring harness that is compatible with the vehicle's electrical system thereby facilitating the control unit 28 to be plugged into the vehicle's electrical system via an OBD port or the like.

The control unit 28 is in electrical communication with a horn 30 of the vehicle 16 and with an electric window system 32 of the vehicle 16. Additionally, the horn 30 is actuated to emit an audible alarm and the electric window system 32 is actuated to roll down windows 34 of the vehicle 16 when the control unit 28 is actuated into the alert condition. In this way the control unit 28 alerts a nearby person that the passenger is unattended in the vehicle 16 and to facilitate an interior of the vehicle 16 to be ventilated.

The control unit 28 comprises a control circuit 36 that is electrically coupled to each of the passenger pressure pads 12 and the driver pressure pad 18. The control circuit 36 is electrically coupled to the vehicle's horn 30 and the control circuit 36 is electrically coupled to the electric window system 32 of the vehicle 16. The control unit 28 includes an electronic timer 38 that is electrically coupled to the control circuit 36. The electronic timer 38 counts down a first duration of time or a second duration of time. The first duration of time may be approximately 60.0 seconds and the second duration of time may be approximately 30.0 seconds.

The electronic timer 38 is actuated to countdown the first duration of time when the any of the passenger pressure pads 12 detects the weight of the passenger and the driver pressure pad 18 does not sense the weight of the driver. In this way the electronic timer 38 facilitates a driver to sit in the driver's seat 20 after the passenger is seated in the passenger seat 14. The electronic timer 38 is actuated to countdown the second duration of time when the driver pressure pad 18 ceases to detect the weight of the driver and any of the passenger pressure pads 12 continues to detect the weight of the passenger. In this way the electronic timer 38 facilitates the driver to park the vehicle 16 and exit the vehicle 16 prior to removing the passenger from the vehicle 16.

The control circuit 36 receives a first alert input when the electronic timer 38 fully counts down the first duration of time. Additionally, the control circuit 36 receives a second alert input when the electronic timer 38 fully counts down the second duration of time. The control circuit 36 actuates the vehicle's horn 30 and rolls down the windows 34 of the vehicle 16 when the control circuit 36 receives either of the first alert input or the second alert input.

A power supply 40 is provided, the power supply 40 is positioned on the vehicle 16 and the power supply 40 is electrically coupled to the control circuit 36. The power supply 40 comprises a solar panel 42 to convert solar energy into electrical energy. Moreover, the power supply 40 is electrically coupled to a battery 44 of the vehicle 16 for charging the battery 44. In this way the power supply 40 ensures that the battery 44 of the vehicle 16 does not become depleted from the operational electrical current of the control unit 28, the passenger pressure pads 12 and the driver pressure pad 18. Additionally, the control unit 28 may include an alarm 46 that is actuated to emit an audible alarm when the control circuit 28 receives either the first alert input or the second alert input.

In use, the electronic timer 38 begins counting down the first duration of time when the driver places the passenger in the passenger seat 14. The vehicle horn 30 is actuated and the windows 34 are rolled down if the driver does not sit in the driver's seat 20 before the first duration of time has elapsed. The electronic timer 38 begins counting down the second duration of time when the driver exits the vehicle 16 while the passenger is seated in the passenger seat 14. The vehicle horn 30 is actuated and the windows 34 are rolled down if the driver does not remove the passenger from the vehicle 16 before the second duration of time has elapsed. In this way the electronic timer 38 reduces the likelihood that the passenger is left unattended when the driver places the passenger in the vehicle 16. Additionally, the electronic timer 38 reduces the likelihood that the driver forgets to remove the passenger from the vehicle 16 when the driver exits the vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An unattended occupant alarm assembly for rolling down a window of a vehicle and actuating the vehicle's horn when an occupant is left unattended in the vehicle, said assembly comprising:

a plurality of passenger pressure pads, each of said passenger pressure pads being integrated into a respective passenger seat in the vehicle wherein each of said passenger pressure pads is configured to detect the weight of a passenger sitting in any other the passenger seats;
a driver pressure pad being integrated into a driver's seat of the vehicle wherein said driver pressure pad is configured to detect the weight of a driver sitting in the driver's seat; and
a control unit being coupled to the vehicle, said control unit being in electrical communication with each of said passenger pressure pads and said driver pressure pad, said control unit being actuated into a monitoring condition when said driver pressure pad and any of said passenger pressure pads respectively detects weight of the driver and weight of the passenger, said control unit being actuated into a standby condition when said driver pressure pad does not detect the weight of the driver and any of said passenger pressure pads detects the weight of the passenger, said control unit being actuated into an alert condition when said driver pressure pad does not detect the weight of the driver and any of said passenger pressure pads detects the weight of the passenger when said control unit has been actuated into said standby condition for a pre-determined duration of time, said control unit being in electrical communication with a horn of the vehicle, said control unit being in electrical communication with an electric window system of the vehicle, the horn being actuated to emit an audible alarm and the electric window system being actuated to roll down windows of the vehicle when said control unit is actuated into said alert condition wherein said control unit is configured to alert a nearby person that the passenger is unattended in the vehicle and to facilitate an interior of the vehicle to be ventilated, wherein said control unit comprises
a control circuit being electrically coupled to each of said passenger pressure pads and said driver pressure pad, said control circuit being electrically coupled to the vehicle's horn, said control circuit being electrically coupled to the electric window system of the vehicle, and
an electronic timer being electrically coupled to said control circuit, said electronic timer counting down a first duration of time or a second duration of time, wherein said electronic timer is actuated to countdown said first duration of time when said any of said passenger pressure pads detects the weight of the passenger and then said driver pressure pad does not sense the weight of the driver wherein said electronic timer is configured to facilitate a driver to sit in the driver's seat after the passenger is seated in the passenger seat, wherein said electronic timer is actuated to countdown said second duration of time when said driver pressure pad ceases to detect the weight of the driver and then any of said passenger pressure pads continues to detect the weight of the passenger wherein said electronic timer is configured to facilitate the driver to park the vehicle and exit the vehicle prior to removing the passenger from the vehicle.

2. The assembly according to claim 1, wherein said control circuit receives a first alert input when said electronic timer fully counts down said first duration of time.

3. The assembly according to claim 2, Wherein said control circuit receives a second alert input when said electronic timer fully counts down said second duration of time.

4. The assembly according to claim 3, wherein said control circuit actuates the vehicle's horn and rolls down the windows of the vehicle when said control circuit receives either of said first alert input or said second alert input.

5. An unattended occupant alarm assembly for rolling down a window of a vehicle and actuating the vehicle's horn when an occupant is left unattended in the vehicle, said assembly comprising:
a plurality of passenger pressure pads, each of said passenger pressure pads being integrated into a respective passenger seat in the vehicle wherein each of said passenger pressure pads is configured to detect the weight of a passenger sitting in any other the passenger seats;
a driver pressure pad being integrated into a driver's seat of the vehicle wherein said driver pressure pad is configured to detect the weight of a driver sitting in the driver's seat;
a control unit being coupled to the vehicle, said control unit being in electrical communication with each of said passenger pressure pads and said driver pressure pad, said control unit being actuated into a monitoring condition when said driver pressure pad and any of said passenger pressure pads respectively detects weight of the driver and weight of the passenger, said control unit being actuated into a standby condition when said driver pressure pad does not detect the weight of the driver and any of said passenger pressure pads detects the weight of the passenger, said control unit being actuated into an alert condition when said driver pressure pad does not detect the weight of the driver and any of said passenger pressure pads detects the weight of the passenger when said control unit has been actuated into said standby condition for a pre-determined duration of time, said control unit being in electrical communication with a horn of the vehicle, said control unit being in electrical communication with an electric window system of the vehicle, the horn being actuated to emit an audible alarm and the electric window system being actuated to roll down windows of the vehicle when said control unit is actuated into said alert condition wherein said control unit is configured to alert a nearby person that the passenger is unattended in the vehicle and to facilitate an interior of the vehicle to be ventilated, said control unit comprising:
a control circuit being electrically coupled to each of said passenger pressure pads and said driver pressure pad, said control circuit being electrically coupled to the vehicle's horn, said control circuit being electrically coupled to the electric window system of the vehicle;
an electronic timer being electrically coupled to said control circuit, said electronic timer counting down a first duration of time or a second duration of time, said electronic timer being actuated to countdown said first duration of time when said any of said passenger pressure pads detects the weight of the passenger and then said driver pressure pad does not sense the weight of the driver wherein said electronic timer is configured to facilitate a driver to sit in the driver's seat after the passenger is seated in the passenger seat, said electronic timer being actuated to countdown said second duration of time when said driver pressure pad ceases to detect the weight of the driver and then any of said passenger pressure pads continues to detect the weight of the passenger Wherein said electronic timer is configured to facilitate the driver to park the vehicle and exit the vehicle prior to removing the passenger from the vehicle, said control circuit receiving a first alert input when said electronic timer fully counts down said first duration of time, said control circuit receiving a second alert input when said electronic timer fully counts down said second duration of time, said control circuit actuating the vehicle's horn and rolling down the windows of the vehicle when said control circuit receives either of said first alert input or said second alert input; and a power supply being positioned on the vehicle, said power supply being electrically coupled to said control circuit, said power supply comprising a solar panel being configured to convert solar energy into electrical energy, said power supply being electrically coupled to a battery of the vehicle for charging the battery.

\* \* \* \* \*